(12) United States Patent
Florexil

(10) Patent No.: US 10,936,830 B2
(45) Date of Patent: Mar. 2, 2021

(54) INTERPRETING ASSISTANT SYSTEM

(71) Applicant: Saida Ashley Florexil, West Palm Beach, FL (US)

(72) Inventor: Saida Ashley Florexil, West Palm Beach, FL (US)

(*) Notice: Subject to any disclaimer, the term of this patent is extended or adjusted under 35 U.S.C. 154(b) by 0 days.

(21) Appl. No.: 16/658,774

(22) Filed: Oct. 21, 2019

(65) Prior Publication Data

US 2020/0050674 A1 Feb. 13, 2020

Related U.S. Application Data

(63) Continuation-in-part of application No. 15/885,168, filed on Jan. 31, 2018, now Pat. No. 10,453,459.

(Continued)

(51) Int. Cl.
*G06F 40/58* (2020.01)
*G10L 15/22* (2006.01)
(Continued)

(52) U.S. Cl.
CPC ............ *G06F 40/58* (2020.01); *G06F 3/0484* (2013.01); *G06F 3/167* (2013.01); *G10L 15/22* (2013.01); *G10L 15/26* (2013.01)

(58) Field of Classification Search
CPC ............... H04M 7/0039; H04M 15/93; H04M 1/7253; H04M 1/72533; H04M 1/72527; H04M 1/72519; H04M 1/6091; H04M 1/6066; H04M 1/6058; H04L 2012/2849; H04L 12/40117; H04L 12/2812; H04L 12/2805; H04H 60/58; H04H 20/95; H04H 20/89; H04H 20/88; G10L 15/28;
G10L 15/265; G10L 15/26; G10L 15/22; G10L 15/20; G10L 15/005; G10L 15/00; G09B 21/009; G06F 40/58; G06F 40/56; G06F 40/55; G06F 40/49; G06F 40/47; G06F 40/45; G06F 40/44; G06F 40/42; G06F 40/40; G06F 40/289; G06F 40/284; G06F 40/279; G06F 40/274; G06F 40/268; G06F 40/263; G06F 40/242; G06F 40/237; G06F 40/232; G06F 40/226; G06F 40/221;G06F 40/216; G06F 40/211; G06F 40/205;G06F 40/20;
(Continued)

(56) References Cited

U.S. PATENT DOCUMENTS 10,074,381 B1* 9/2018 Cowburn ................ G10L 21/10
10,453,459 B2* 10/2019 Florexil ............... G09B 21/009
(Continued)

*Primary Examiner* — Andrew C Flanders
(74) *Attorney, Agent, or Firm* — The Keys Law Firm PLLC

(57) ABSTRACT

An interpreting assistant system which provides to a user captions of auditory communications in the user's vicinity. The interpreting assistant system includes a smart microphone transmitter that defines an input device which converts auditory communications into audio signals and transmit the signals a translation device, with a smart phone defining the translation device which generates a text transcript from the audio signals and send the transcript file to a display device, with the display device being defined by a wearable display interface which displays the transcript for a user to see. When in use, the interpreting assistant system provides for the display of a real time transcription and display of auditory communications such as spoken words for a user that may have hearing difficulties.

12 Claims, 6 Drawing Sheets

Related U.S. Application Data

(60) Provisional application No. 62/604,022, filed on Jun. 21, 2017.

(51) Int. Cl.
*G06F 3/0484* (2013.01)
*G06F 3/16* (2006.01)
*G10L 15/26* (2006.01)

(58) Field of Classification Search
CPC .......... G06F 40/10; G06F 40/00; G06F 3/16; G06F 3/162; G06F 3/165; G06F 3/167; G06F 3/0484; G06F 16/3337; G06F 15/16; G06F 15/0208; G06F 1/163
See application file for complete search history.

(56) References Cited

U.S. PATENT DOCUMENTS

| | | | |
|---|---|---|---|
| 2006/0079291 A1* | 4/2006 | Granovetter | H04M 1/605 455/563 |
| 2007/0225973 A1* | 9/2007 | Childress | G10L 21/0208 704/211 |
| 2008/0077387 A1* | 3/2008 | Ariu | G10L 15/22 704/3 |
| 2009/0076816 A1* | 3/2009 | Bradford | G10L 21/06 704/235 |
| 2009/0099836 A1* | 4/2009 | Jacobsen | G06F 40/58 704/3 |
| 2010/0169073 A1* | 7/2010 | Almagro | G06F 40/58 704/3 |
| 2010/0185434 A1* | 7/2010 | Burvall | G10L 15/005 704/3 |
| 2010/0235161 A1* | 9/2010 | Kim | G10L 15/26 704/3 |
| 2011/0054647 A1* | 3/2011 | Chipchase | H04M 3/53366 700/94 |
| 2013/0289971 A1 | 10/2013 | Parkinson et al. | |
| 2015/0051898 A1* | 2/2015 | Cuthbert | G06F 40/58 704/3 |
| 2016/0248899 A1 | 8/2016 | Lee et al. | |

\* cited by examiner

INTERPRETING ASSISTANT SYSTEM

CROSS REFERENCE TO RELATED APPLICATIONS

This application is a continuation in part of, claims the benefit of, and incorporates by reference the co-pending U.S. non-provisional patent application Ser. No. 15/885,168, filed on Jan. 31, 2018, which itself claimed the benefit of and incorporated by reference the U.S. provisional patent application Ser. No. 62/604,022, filed Jun. 21, 2017.

BACKGROUND OF THE INVENTION

Field of the Invention

This invention relates generally to a communication assisting system and, more particularly, to a communication assisting system which facilitates a real time visual presentation of auditory communications, particularly language based auditory communications.

Description of the Prior Art

Hearing difficulties affect huge numbers of people throughout the world. It is believed that in the United State alone, there are approximately 1,000,000 people over five years of age who are functionally deaf and about 8,000,000 people above five years of age are hard of hearing. And clearly, having a level of hearing impairment can significantly affect one's ability to communicate with others effectively.

It is generally held that people with a hearing loss greater than 60 decibels may struggle to interact with other people. Even with a hearing aid or a cochlear implant, such individuals may struggle to understand spoken words and depend on lip-reading because of their hearing difficulties. But still, many hearing impaired people do not know how to lip-read, and many do not know sign language. So whether it be in personal conversations in daily living or in a business setting, the provision of equal hearing access remains elusive in many social interactions.

Accordingly, there remains a need for an interpreting system which assists individuals with hearing difficulties by providing captions of auditory communications in real time. It would be desirable if such an interpreting assistant system operated to direct captions to a discrete or an integrated display device. It would be additionally desirable for such an interpreting assistant system to be able to display captions relating to auditory communications in one's environment that it is transcribing in real time or which is being provided in real time as a wireless audio signal.

SUMMARY OF THE INVENTION

An interpreting assistant system which comprises a primary input device having a microphone adapted to generate audio signals from auditory communication, and a wireless networking interface adapted to communicate electrical signals wirelessly; wherein said primary input device is configured to transmit the audio signals wirelessly; a translation device having at least one translation device wireless networking interface adapted to receive the audio signals transmitted by the primary input device and a processor configured to generate a text transcription which corresponds to words in the audio signals received by the translation device; and a display interface adapted to display text visually, wherein said translation device is configured to transmit the text transcription to the display interface.

It is an object of this invention to provide an interpreting assistant system which assists individuals with hearing difficulties by providing captions of auditory communications in real time.

It is another object of this invention to provide an interpreting assistant system which operates to direct captions to a discrete or an integrated display device.

It is yet another object of this invention to provide an interpreting assistant that is able to display captions relating to auditory communications in one's environment that it is transcribing in real time or which is being provided in real time as a wireless audio signal.

These and other objects will be apparent to one of skill in the art.

DETAILED DESCRIPTION OF THE INVENTION

Described herein is an interpreting assistant system for providing to a user captions of auditory communications in the user's vicinity. The primary components of Applicant's interpreting assistant system are an input device, a translation device and a display device. When in operation, the interpreting assistant system enables the real time transcription and display of auditory communications such as spoken words in a user's vicinity.

Figure 1:
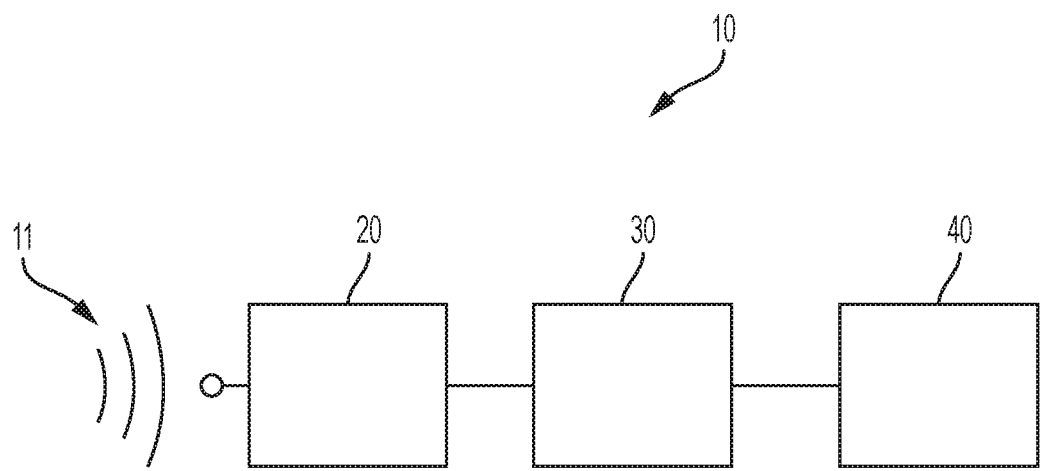
FIG. 1 is a block diagram showing the electrical signal flow through the primary operational components of an interpreting assistant system built in accordance with the present invention.

Referring now to the drawings and in particular FIG. 1, an interpreting assistant system 10 may employ an input device 20 which receives auditory communications 11 in the form of sound and/or an electrical signal, a translation device 30 which generates and/or formats captions which correspond to the auditory communication received by the input device 20, a display device 40 which displays the captions from the translation device 30. As discussed in greater detail below, while in any embodiment the input device 20, translation device 30 and the display device 40 remain electrically connected so as to facilitate the communication of electrical signals between them, in different embodiments, the input device 20, translation device 30 and the display device 40 may be housed together in a single housing or apart in two or three different housings.

Figure 2:
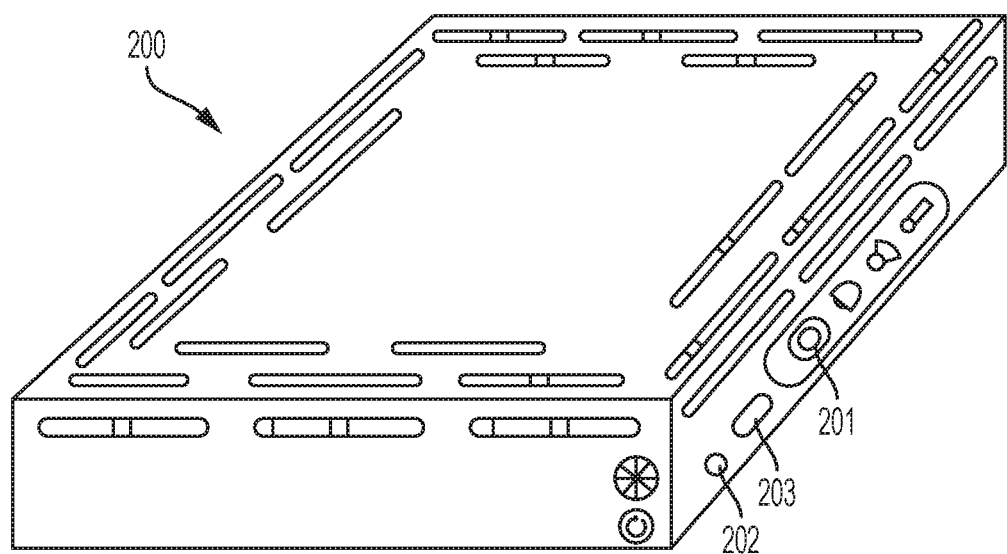
FIG. 2 is a side perspective view of a microphone transmitter housing embodying an input device of an interpreting assistant system built in accordance with the present invention.

Referring now to FIG. 2, a smart microphone transmitter 200 defining an input device of the interpreting assistant system is shown. The smart microphone transmitter 200 includes a controller, wireless networking interface, an antenna, and battery as interconnected internal components, as well as a microphone that is connected to the wireless networking interface so as to allow audio signals created by the microphone (that are converted from auditory communication) to be transmitted to a discrete translation device over a wireless network.

The microphone may directly output a digital audio signal. In other embodiments in which the microphone outputs an analog signal, an analog to digital converter is included in the smart microphone transmitter 200 in order to convert analog audio signals created by the microphone to digital signals.

The microphone may be defined by a directional microphone 201 which operates to enhance sound coming from a target direction relative to the smart microphone transmitter 200 (based on the present orientation of the smart microphone transmitter 200) and to diminish background noise.

The wireless networking interface may be defined by a Bluetooth interface. In this regard, it is appreciated that the audio signals created by the microphone may be transmitted over a Bluetooth connection to a translation device that also includes a Bluetooth interface and that has been paired with the smart microphone transmitter 200.

The antenna may be defined by a radio frequency ("RF") antenna. In operation, the antenna enables the smart microphone transmitter 200 to receive a wireless RF signal which correspond to audio signals representing auditory communication in the vicinity of the smart microphone transmitter 200. Such signals can then be sent to a translation device over the wireless networking interface. In some embodiments, such signals could come from other input devices of the interpreting assistant system, such as the microphone clip described below. In other embodiments, however, this RF antenna could be utilized in a public place which desires to provide equal hearing access to visitors at an effective cost in a manner such as that described below.

For example, for a public place desiring to provide equal hearing access to its visitors, the instant invention enables them to do so efficiently. In such a circumstance, the operator would merely (1) install an RF transmitter which broadcasts audio signals corresponding to any selected auditory communication being broadcast at the location from an in building transmitter and (2) post the RF frequency of the broadcast. In such a scenario, any visitor having a smart microphone transmitter 200 built in accordance with the present invention could simply set the RF antenna on their smart microphone transmitter 200 to the correct frequency to receive the broadcast, with the smart microphone transmitter 200 the directing those signals to a translation device over the wireless networking interface. Indeed, if the smart microphone transmitter 200 is positioned in a movie theatre, the movie theatre can broadcast on a designated RF channel audio signals representing auditory communication in the movie and the smart microphone transmitter 200 and pick these signals up and send them to a translation device.

The smart microphone transmitter 200 may additionally include an audio input port 202 to receive audio signals in the manner described in the preceding paragraph over a physical connector and/or a USB port 203 to receive audio signals and/or electrical power.

Figure 3:
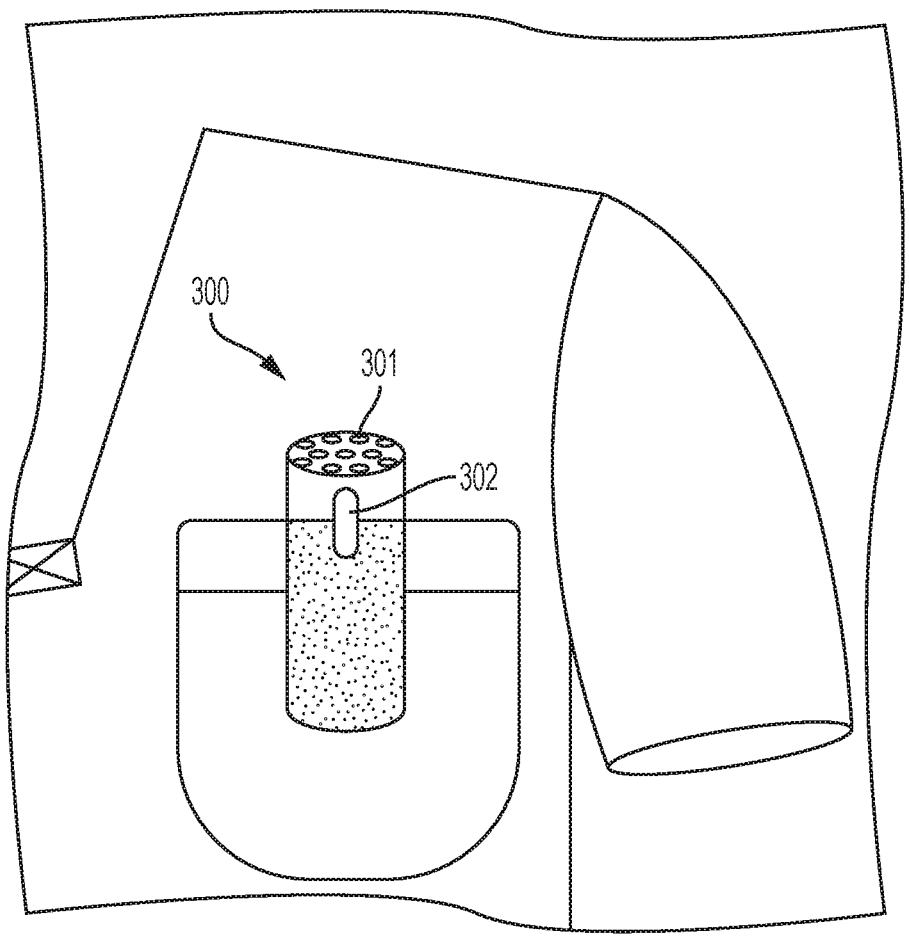
FIG. 3 is a front elevational view of a micro clip housing embodying an input device of an interpreting assistant system built in accordance with the present invention.

Referring now to FIG. 3, a microphone clip 300 defining an input device of the interpreting assistant system is shown. The microphone clip 300 may include an internal controller, an antenna, and a power source, as well as a microphone 301 and operates as a supplemental input device in conjunction with the smart microphone transmitter. The microphone clip includes an attachment device, such as a biased clip 302, to allow it to be releasably coupled onto or adjacent to a target speaker. The antenna may be defined by an RF antenna. In this regard, the microphone clip 300 operates to convert auditory communication into audio signals and send those audio signals over the antenna to the smart microphone transmitter. Because of its proximity to the target speaker, however, a comparison of the audio signals from the microphone clip 300 with those picked up by the smart microphone transmitter enables the translation device to identify the speaking of the target speaker and distinguish communication from the target from the speaking of other speakers in the area so as to distinguish the transcription of the target speaker's speaking when the transcription is displayed (but still display transcriptions of the speaking of the other speakers). It is appreciated that in settings like a classroom, such functionality would enable a student to particularly note what an instructor (wearing the microphone clip 300) was saying but also follow what discussion or questions may be directed at the instructor.

It is appreciated that distinguishing communication from the target from the speaking of other speakers in the area may be performed using conventional multi-microphone techniques for analyzing spatial information about the relative position of competing sound sources, with the understanding that the microphone clip 300 would be the target (primary) sound source and all others would be secondary sources to be distinguished therefrom.

Distinguishing communication may also be performed to distinguish auditory communication picked up by the smart microphone transmitter from audio signals received by the smart microphone transmitter over its antenna.

Figure 4:
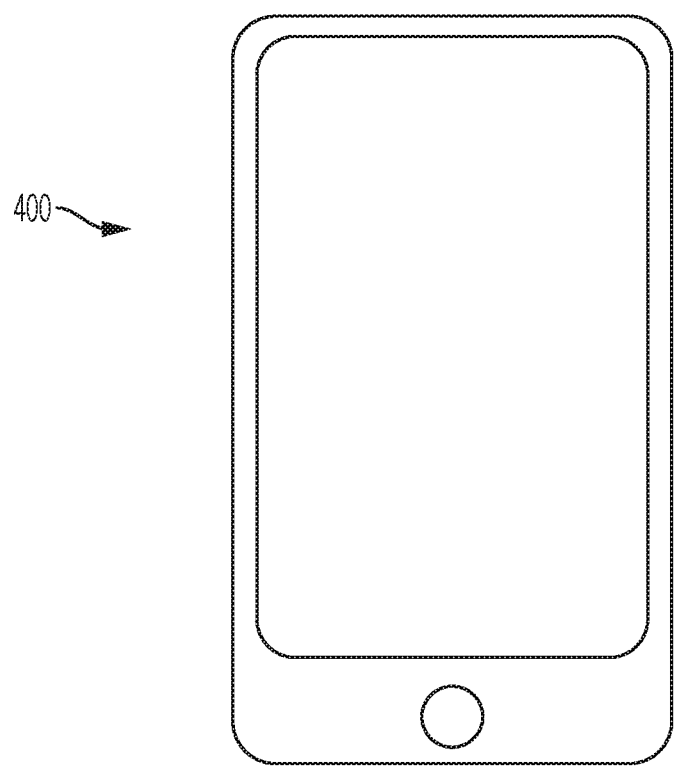
FIG. 4 is a top plan view of a smart phone embodying a translation device of an interpreting assistant system built in accordance with the present invention.

Referring now to FIG. 4, a smart phone 400 defining a translation device of the interpreting assistant system is shown. In accordance with the presenting invention, the smart phone 400 includes at least a processor, memory, and a wireless networking interface, with the memory containing instructions embodied as transcription software that causes the processor to generate a text transcription from audio signals which are received from the smart microphone transmitter and send the text transcription to a display device. The memory may also include instructions embodied as formatting software that causes the processor to format a generated text transcription for use by a display device, including to change the size and color of the transcription.

It is contemplated that the smart phone's 400 wireless networking interface may define a Bluetooth interface so as to allow the smart phone 400 to receive audio signals from an input device that is paired with the smart phone 400, such as a smart microphone transmitter, as well as to allow the smart phone 400 to send the text transcription as computer readable data to a display device that has been paired with the smart phone 400.

Figure 5:
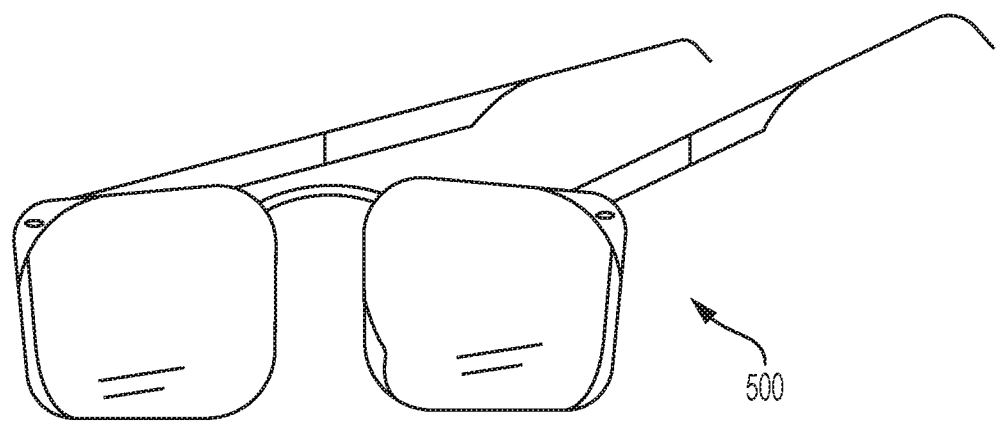
FIG. 5 is a front perspective view of a pair of smart glasses embodying a display device for an interpreting assistant system built in accordance with the present invention.

Referring now to FIG. 5, a pair of wearable smart glasses 500 defining a display device of the interpreting assistant system is shown. The wearable smart glasses 500 may be defined by conventional wearable computer glasses which superimpose information onto a wearer's field of view. The wearable smart glasses 500 in accordance with the present invention may employ holographic optics.

The wearable smart glasses 500 include a wireless networking interface operative to receive electrical signals from the smart phone's wireless networking interface. The wearable smart glasses' 500 wireless networking interface may define a Bluetooth interface. In this regard, the wearable smart glasses 500 may operate as a display device by receiving a signal over their Bluetooth interface from a paired smart phone that includes a text transcription and then displaying this text transcription on a wearer's field of view.

Figure 6:
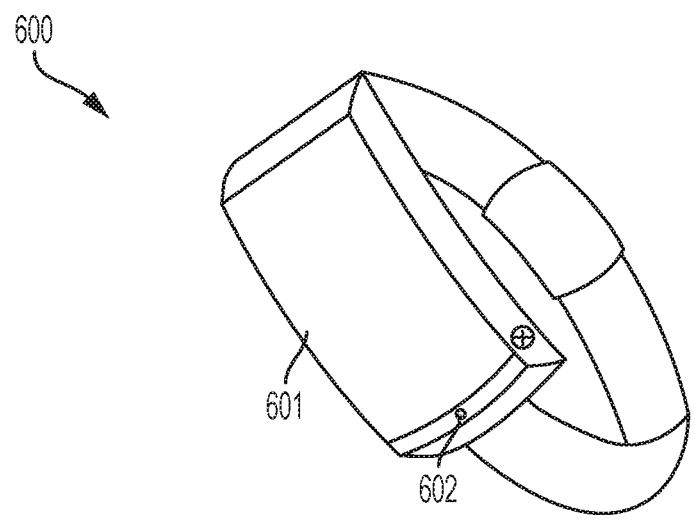
FIG. 6 is a top perspective view of a smart watch embodying a display device of an interpreting assistant system built in accordance with the present invention.

Referring now to FIG. 6, a smart watch 600 defining a display device of the interpreting assistant system is shown. The smart watch 600 may be defined by conventional wrist wearable mobile device that includes a visual display interface that is defined by a display screen 601. The smart watch 600 includes a wireless networking interface operative to receive electrical signals from the smart phone's wireless networking interface. The smart watch's 600 wireless networking interface may define a Bluetooth interface. In this regard, the smart watch 600 may operate as a display device by receiving a signal over their Bluetooth interface from a paired smart phone that includes a text transcription and then displaying this text transcription on the visual display interface.

The smart watch 600 also may include a microphone 602 that is connected to its wireless networking interface, as well as capture software which causes the microphone to generate audio signals from auditory communication that is picked up and then transmit the audio signals to the smart phone configured as a translation device where they can be transcribed and returned to the smart watch 600.

Figure 7:
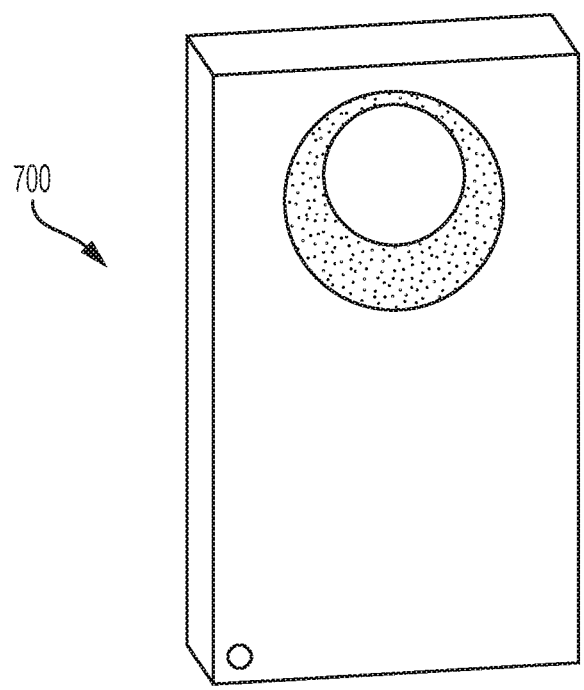
FIG. 7 is a front perspective view of a video transmitter housing embodying an input device of an interpreting assistant system built in accordance with the present invention.

Referring now to FIG. 7, a sign transmitter 700 which includes an antenna, and power source as interconnected internal components whose operation is controlled by an internal controller, as well as a camera that is connected to the controller is shown. The sign transmitter 700 may include sign software which enables it to convert sign language signs, such as American Sign Language signs, which are picked up by the camera and convert them to audio signals which correspond to the letters or words that were signed in from of the camera. These audio signals may then be transmitted through the antenna to a broadcasting device having an antenna and a speaker to be played over the speaker. A smart microphone transmitter built in accordance with the present invention and that also includes a speaker may be employed as the broadcasting device. Advantageously, such a configuration enables the smart microphone transmitter, when operating with the sign transmitter 700, to initiate the transcription of auditory communication for display for a hearing impaired user as well as output sound that has been converted from the hearing impaired user's signing.

It is contemplated that the interpreting assistant system in some embodiments may also operate with a Braille transmitter (not shown) for the deafblind. The Braille transmitter can be connected to a smart microphone transmitter, smart phone, or an in building transmitter. In operation, the smart microphone transmitter will pick up verbal communication and either transmit it to the smart phone or send it automatically to the Braille transmitter for the user. If the portable microphone transmitter sends it to the smart phone, the smart phone will translate and transmit the communication to the Braille transmitter which then provide Braille notation.

The Braille transmitter may also allow the deafblind to input what they want to say. The text will be sent to the smart phone and the smart phone will translated it to audio and transmit it to the smart microphone transmitter to voice it out.

Figure 8:
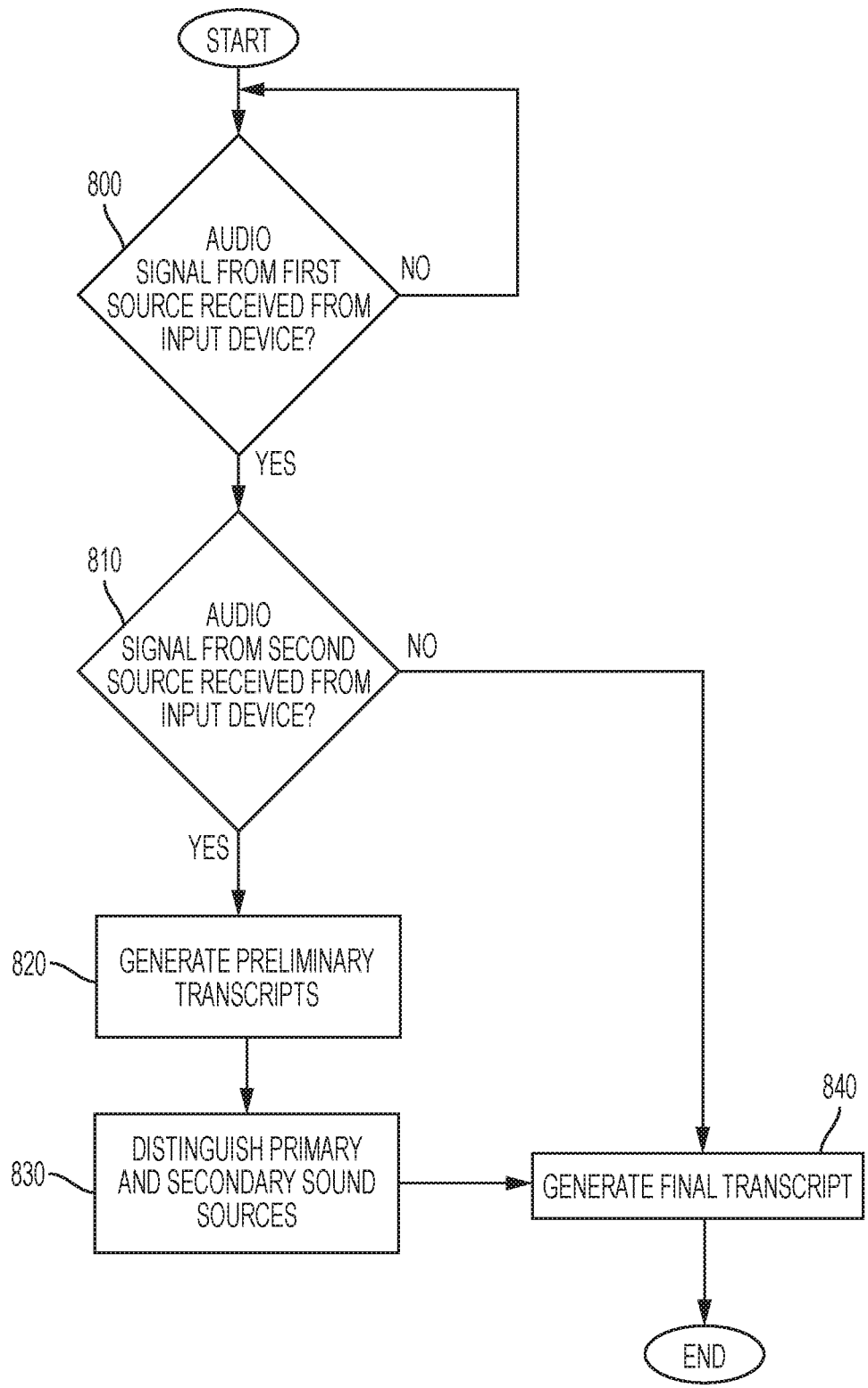
FIG. 8 shows the process through which a text transcription file is generated in an interpreting assistant system built in accordance with the present invention.

Referring now to FIG. 8, the process through which transcription software causes a text transcription to be generated begins with the receipt of an audio signal 800. If the audio signal is from an input device, such as the smart microphone transmitter, the translation device checks to see if there is also an audio signal from a second device being sent from the input device 810. It is appreciated that the metadata in the audio signal would identify the specific source or at least whether there was a first and a second source (as opposed to one source). If audio signals from two sources are received, preliminary transcripts are generated 820 and, then, using the preliminary transcripts, the transcribed text from the differing sources is distinguished by way of the way it will appeared when displayed 830 (such as assigning a different color or font to the text based on the source). Once the text is distinguished, a final transcript is generated which incorporates the distinct assigned appearance.

It is appreciated that while a different font or color is assigned at this stage, it will be the display device which actually implements this distinguishing assignment when it renders the text on a display.

If no audio signal is received from an input device, the translation device simply generates a final transcript 840.

It is contemplated that the formatting of transcripts for display will include preparing a transcript to be shown line by line or as a rolling output on a paired connected device. For example, if wearable smart glasses have been paired as the display device, formatting may include preparing the transcript to be shown line by line while if a smart watch has been paired as the display device, formatting may include preparing the transcript to be shown a rolling output.

It is contemplated that the interpreting assistant system may be employed to translate and display in any number of spoken, written, and signed languages.

In an alternate embodiment, an audio link device may be employed in accordance with the present invention, particularly to increase public place communication efficiency and/or accessibility and safety and help mitigate against background noise. In such an embodiment, a discrete audio link device may be attached on a wall and/or ceiling or a building or transportation vehicle by an administrator of the building or transportation vehicle. The audio link device would then be employed to broadcast electrical signals which correspond to announcements or other location pertinent communication (such as one that would typically be played over a loudspeaker). Advantageously, these electrical signals could be picked up directly by a translation device built in accordance with the present invention and displayed for a user through the translation device.

For example, in such an embodiment with an audio link device in an school, the audio link device may be connected to an intercom sound system of the school using an audio jack adapter, wireless adapter, or other wireless technology to allow transmission of signals representing an auditory communication from the intercom sound system to the audio link device. The audio link device may then be accessed by smartphone(s), which do so through a wireless local area network, allowing a software application on the smartphone (s) to use the signal to create and display a transcript. Such a transcript may be shown as live captioning on a display interface of the smartphone for the user to read (or on a display interface on whatever translation device is receiving the signal and has the software application, such as smart wearable glasses, watch, braille transmitter).

In an alternate embodiment of the sign transmitter, the sign transmitter may include a built-in speaker to voice out audio communication and not need to be connected with the smart microphone transmitter to do that. This embodiment of the sign transmitter may include two lights: one to adjust brightness in a lowlight environment to allow the sign transmitter to pick up sign language more effectively and another to differentiate multiple sign transmitters by colors in a dark environment, and each sign transmitter will display text in different colors. This will allow customers to know who is speaking.

Advantageously, this light color distinguishing feature may allow deaf people who use different sign language to converse with each other. There is approximately 138-300 different sign language in the world. Thus, this transmitter may be used to capture sign language when there are multiple signers. Furthermore, several sign transmitters could be connected among users who converse in different sign languages.

This sign language transmitter can be use with the microphone clips or smart microphone transmitter during a group conversation where the ASL transmitter would capture sign language, and the smart microphone transmitters/microphone clip captures verbal communication and transmits it to a software app on a translation device through Bluetooth connection for translation and for word display.

This sign language transmitter may capture sign language and transmit it to software app on a translation device for the user language translation (based on user language preference). And the words will appear on the display interface for the user to read This sign language transmitter may also transmit the language translation to the sign transmitter to voice it out.

In an alternate embodiment of the smart watch, the smart watch may include a camera to pick up sign language. The smart watch may also include two lights: one to adjust brightness in a lowlight environment to allow the camera to pick up sign language more effectively and the other to differentiate various smart watches by colors in a dark environment, with each smart watches displaying text in different colors. This will allow users to know who is speaking.

It is contemplated that in such an embodiment, several smart watches may be connected among users who converse in different sign languages.

This smart watch embodiment may be used with the microphone clips or smart microphone transmitter during a group conversation where the smart watches would capture sign language, and the smart microphone transmitters/microphone clip captures verbal communication and transmit it to a software app on a translation device through Bluetooth connection for translation and for word display.

This smart watch embodiment may also allow transmittal of a language translation to the smart watch to voice it out.

In an alternate embodiment of the input devices, the microphones may have a led light to differentiated by colors in a dark environment, with each microphone operative to display text in different colors on a software app on a translation device for group conversation or when several microphones are connected. This will allow users to immediately know who is speaking on based on the output created by the application.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An interpreting assistant system, comprising:
    a discrete primary input device having a first microphone adapted to generate audio signals from auditory communication;
    a discrete secondary input device having a second microphone adapted to generate audio signals from auditory communication;
    a translation device having a processor configured to generate text transcriptions which correspond to words in at least one of the audio signals generated by the primary input device and audio signals generated by the secondary input device;
    wherein the primary input device is configured to direct audio signals generated by the primary input device to the translation device, the secondary input device is configured to direct audio signals generated by the secondary input device to the translation device, and the translation device, when receiving the audio signals generated by the primary input device and the audio signals generated by the secondary input device, is configured to identify a target speaker that is closest in physical proximity to the second microphone based on an analysis of the audio signals generated by the primary input device and the audio signals generated by the secondary input device; and
    a display interface adapted to display text visually, wherein said translation device is configured to transmit the text transcription to the display interface and cause the portion of the text transcription which corresponds to auditory communication from the target speak to be distinguished in the text transcription being displayed visually.

2. The interpreting assistant system of claim 1, wherein said display interface is defined by a discrete display device and said translation device is configured to transmit the text transcription to the display interface wirelessly.

3. The interpreting assistant system of claim 2, wherein said discrete display device is defined by a smart watch.

4. The interpreting assistant system of claim 2, wherein said discrete display device is defined by a pair of wearable smart glasses.

5. The interpreting assistant system of claim 1, wherein said translation device is defined by a mobile computer device.

6. The interpreting assistant system of claim 5, wherein said primary input device and said translation device as adapted to wirelessly pair, thereby enabling said translation device to receive the audio signals transmitted by the primary input device wirelessly.

7. An interpreting assistant system, comprising:
    a discrete primary input device having a first microphone adapted to generate audio signals from auditory communication, an antenna adapted to convert radio waves which correspond to audio signals into electrical audio signals, and a wireless networking interface adapted to communicate electrical signals wirelessly;
    a discrete secondary input device having a second microphone adapted to generate audio signals from auditory communication and an antenna adapted to convert audio signals generated by the second microphone of the secondary input device into radio waves;

a translation device having at least one translation device wireless networking interface adapted to receive the audio signals transmitted by the primary input device and a processor configured to automatically generate a text transcription which corresponds to words in at least one of the audio signals generated by the primary input device and audio signals generated by the secondary input device;

wherein the translation device, when receiving the audio signals generated by the primary input device and the audio signals generated by the secondary input device, is configured to identify a target speaker that is closest in physical proximity to the second microphone based on an analysis of the audio signals generated by the primary input device and the audio signals generated by the secondary input device; and a display interface adapted to display text visually, wherein said translation device is configured to transmit the text transcription to the display interface and cause the portion of the text transcription which corresponds to auditory communication from the target speak to be distinguished in the text transcription being displayed visually.

8. The interpreting assistant system of claim 7, wherein said display interface is defined by a discrete display device and said translation device is configured to transmit the text transcription to the display interface wirelessly.

9. The interpreting assistant system of claim 8, wherein said discrete display device is defined by a smart watch.

10. The interpreting assistant system of claim 8, wherein said discrete display device is defined by a pair of wearable smart glasses.

11. The interpreting assistant system of claim 7, wherein said translation device is defined by a mobile computer device.

12. The interpreting assistant system of claim 7, wherein said primary input device and said translation device as adapted to wirelessly pair, thereby enabling said translation device to receive the audio signals transmitted by the primary input device wirelessly.

\* \* \* \* \*